United States Patent
Nagai et al.

[11] Patent Number: 5,190,332
[45] Date of Patent: Mar. 2, 1993

[54] SUCTION PAD FOR ATTRACTING AND HOLDING A WORKPIECE

[75] Inventors: Shigekazu Nagai; Shuuzou Sakurai; Tadasu Kawamoto, all of Ibaraki, Japan

[73] Assignee: SMC Kabushiki Kaisha, Tokyo, Japan

[21] Appl. No.: 755,748

[22] Filed: Sep. 6, 1991

[30] Foreign Application Priority Data

Sep. 6, 1990 [JP] Japan .................. 2-93899[U]
Dec. 25, 1990 [JP] Japan .................. 2-401615[U]

[51] Int. Cl.⁵ .................................. B66C 1/02
[52] U.S. Cl. .................................. 294/64.1; 271/90
[58] Field of Search ............ 294/64.1, 65; 248/362, 248/363; 116/208, DIG. 24; 271/90

[56] References Cited

U.S. PATENT DOCUMENTS

| | | | |
|---|---|---|---|
| 1,842,383 | 1/1932 | Bell | 294/64.1 |
| 2,194,989 | 3/1940 | Torpin | 294/64.1 |
| 2,815,919 | 12/1957 | Pribil | 248/363 |
| 3,152,828 | 10/1964 | Lytle | 294/64.1 |
| 3,261,388 | 7/1966 | Kovac et al. | 116/208 X |
| 3,656,794 | 4/1972 | McCord | 294/64.1 |
| 3,910,620 | 10/1975 | Sperry | 294/64.7 |
| 4,600,229 | 7/1986 | Oten | 294/64.1 |
| 4,702,508 | 10/1987 | Weiner et al. | 116/208 X |

FOREIGN PATENT DOCUMENTS

| | | | |
|---|---|---|---|
| 201469 | 12/1986 | European Pat. Off. | |
| 1142409 | 2/1985 | U.S.S.R. | 294/64.1 |
| 1509319 | 9/1989 | U.S.S.R. | 294/64.1 |
| 156920 | 1/1921 | United Kingdom. | |
| 207177 | 4/1924 | United Kingdom. | |
| 760891 | 11/1956 | United Kingdom. | |
| 1006042 | 9/1965 | United Kingdom. | |
| 1041653 | 9/1966 | United Kingdom. | |
| 1060435 | 3/1967 | United Kingdom. | |
| 1482906 | 8/1977 | United Kingdom. | |
| 2048833 | 12/1980 | United Kingdom. | |

Primary Examiner—Charles A. Marmor
Assistant Examiner—Joseph D. Pape
Attorney, Agent, or Firm—Oblon, Spivak, McClelland, Maier & Neustadt

[57] ABSTRACT

Disclosed herein is a suction pad for attracting and holding a work, which comprises a suction base coupled to a vacuum suction source, a suction skirt integrally provided in continuation with the base, and a rib provided in a position near a circumferential end of the suction skirt, the rib being brought into contact with the work when the suction pad attracts and holds the work.

9 Claims, 4 Drawing Sheets

SUCTION PAD FOR ATTRACTING AND HOLDING A WORKPIECE

BACKGROUND OF THE INVENTION

1. Field of the Invention

The present invention relates to a suction pad for attracting a work or holding the work after the work is attracted, in such a way as to enable the work to be fed to a predetermined position.

2. Description of the Related Art

There has heretofore been used a suction cup or pad coupled to a vacuum suction source in order to feed, for example, a thin plate-shaped work to a desired position.

FIG. 1 shows this type of suction pad. More specifically, a suction pad 2 employed in a prior art comprises a base 4 and a suction skirt 6. In addition, the suction pad 2 has a through hole 8 defined therein, which extends from the base 4 to the inside of the suction skirt 6. If an unillustrated vacuum suction source is energized when it is desired to feed a work W, the inside of the skirt 6 of the suction pad 2, which abuts against the work W, is subjected to the vacuum, so that a peripheral edge 6a of the suction skirt 6 adheres closely to the work W.

The suction pad 2 which has adhered closely to the work W in this way is displaced by, for example, an arm of an unillustrated robot so as to feed the work W in a predetermined direction in unison with each other.

In order to release the work W from the suction pad 2 after the work W has been attracted by the suction pad 2 and fed in the predetermined direction, compressed air is introduced into the skirt 6 of the suction pad 2 through the through hole 8 of the base 4 coupled to the vacuum suction source so as to release the inside of the skirt 6 from the vacuum. As a result, the work W is moved away from the suction pad 2.

In a case where a work W with a very smooth surface, such as metal, glass, etc., is attracted and held by the suction pad 2, however, if the suction pad 2 is formed of synthetic rubber or the like, the skirt 6 has an adhesive force, and hence the attracting force of the suction pad 2 with respect to the work W is extremely great. In other words, the degree of adhesion between the suction pad 2 and the work W becomes greater. Therefore, when it is desired to release the work W from the suction pad 2, the compressed air is slow to enter an attraction or suction surface of the skirt 6, i.e., between the skirt 6 of the suction pad 2 and the work W, thereby requiring much time to release the work W from the suction pad 2.

As shown in FIG. 1, the thickness of the leading end 6a of the skirt 6 of the suction pad 2 is thinner than that of each of other portions thereof as mentioned above. Thus, when air in the skirt 6 is drawn, respective attracting portions of the leading end 6a with respect to the work W are often deformed by the vacuum.

When a large-diameter suction pad 2 is used, there is observed a phenomenon that undesired or improper sound is produced, by pressing such a suction pad 2 against the work W and forcing out air from the inside of the skirt 6 at the time that the work W is attracted by the suction pad 2. Specifically, when the circumferential leading end 6a of the skirt 6 is brought into contact with the work W so as to make an airtight state therebetween and the suction pad 2 is pressed against the work W under this condition, the compressed air in the suction pad 2 is forced to escape at some point in time. Consequently, the thin-wall portion of the leading end 6a of the suction skirt 6 vibrates to produce undesired or improper sound. The sound which is produced at regular intervals while the work W is being attracted and held by the suction pad and being fed to a predetermined direction, impairs the working environment and produces a cause of noise pollution.

In order to feed a printed circuit board with ICs mounted thereon, for example, the quality of the material of each suction pad and the size thereof must be selected according to the type and size of each work as in a case where a conductive suction pad is used as a destaticizing countermeasure.

In this case, the quality of the material of the suction pad cannot be identified with ease from its appearance. Therefore, paint is applied on the surface of the suction pad and the quality of its material is indicated thereon.

The above-described prior art has, however, the problem that when the attraction of the work W by the suction pad is carried out, a flexible resin body constituting the suction skirt is expanded and shrunk and the paint applied onto the surface of the suction pad is gradually separated from its surface, so that characters, symbols, etc. cannot be identified.

SUMMARY OF THE INVENTION

It is a general object of the present invention to provide a suction pad capable of reliably releasing a work therefrom in a short period of time when the suction pad is used to hold the work or feed the same in a predetermined direction.

It is a principal object of the present invention to provide a suction pad capable of stably attracting and holding a work and avoiding the possibility of the work being dropped while being fed.

It is another object of the present invention to provide a suction pad capable of reducing, as low as possible, sound produced at a position where a work is attracted and held by the suction pad when the suction pad is used to feed the work to a predetermined position, thereby avoiding the possibility of noise pollution or the like.

It is a further object of the present invention to provide a suction pad capable of identifying characters, symbols, etc. without separation of any paint applied on the surface of the suction pad by work feeding operations or the like.

It is a still further object of the present invention to provide a suction pad for attracting and holding a work, which comprises a suction base coupled to a vacuum suction source, a suction skirt integrally provided in continuation with the base, and a rib provided in a position near a circumferential end of the suction skirt, the rib being brought into contact with the work when the suction pad attracts and holds the work.

It is a still further object of the present invention to provide a suction pad as described above wherein the suction skirt has a plurality of cuttable thin-walled portions of progressively increasing different diameters, which are concentrically formed on the skirt.

It is a still further object of the present invention to provide a suction pad as described above wherein the thin-walled portions have respectively corresponding circumferentially-defined grooves and are cuttable along the grooves.

It is a still further object of the present invention to provide a suction pad as described above wherein the grooves are defined inside the suction skirt.

It is a still further object of the present invention to provide a suction pad as described above wherein a plurality of extensions are provided near the thin-walled portions respectively and circumferentially formed inside of the suction skirt, and the extensions respectively serve as suction surfaces after the extensions are cut at the corresponding thin-walled portions.

It is a still further object of the present invention to provide a suction pad as described above wherein means for identifying the degree of abrasion of the suction pad is provided on the side of a suction surface of the skirt.

It is a still further object of the present invention to provide a suction pad as described above wherein a plurality of concave portions for causing air to remain therein at the time that the work is attracted and held by the suction pad are defined in at least a part of an inner peripheral wall of the suction skirt.

It is a still further object of the present invention to provide a suction pad as described above wherein the concave portions are formed as a plurality of grooves circumferentially defined in the suction skirt and whose diameters are different from one another.

It is a still further object of the present invention to provide a suction pad as described above further including a plurality of ribs formed on the inside surface of the suction pad.

It is a still further object of the present invention to provide a suction pad as described above wherein recesses for indicating characters, symbols, etc. by applying paint or fine grain patterns thereto are defined in at least a part of the surface of the suction pad.

It is a still further object of the present invention to provide a suction pad as described above wherein the recesses are defined in the surface of the suction skirt.

It is a still further object of the present invention to provide a suction pad as described above wherein the recesses are defined in the surface of the base.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
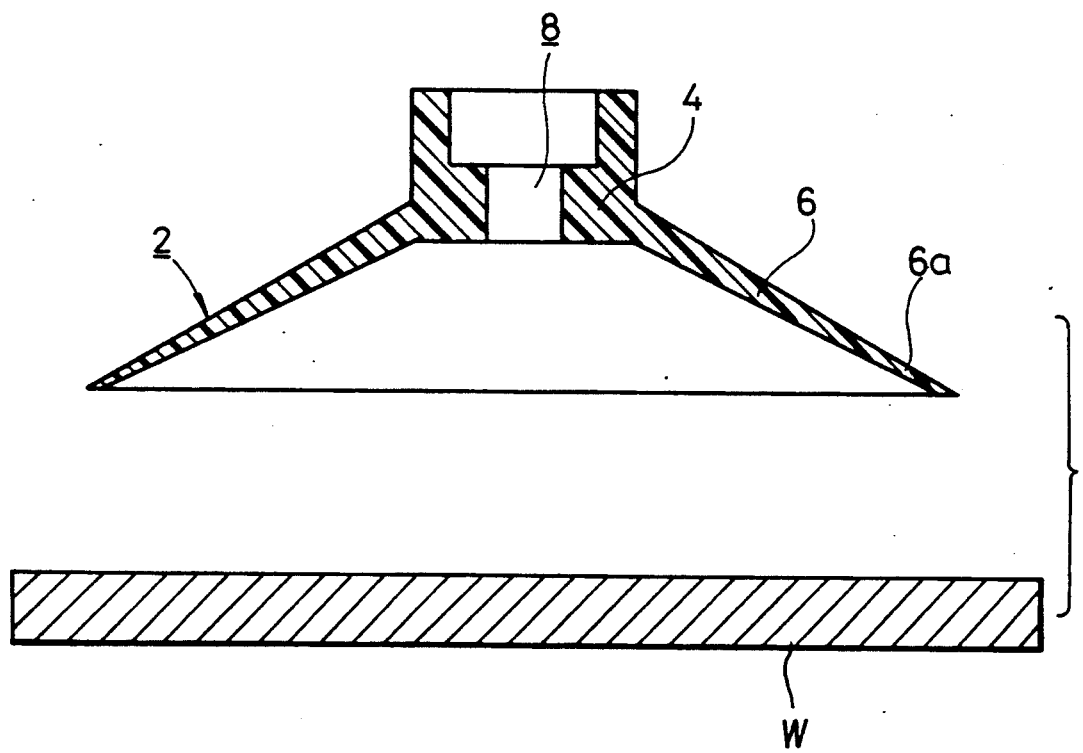
FIG. 1 is a schematic vertical cross-sectional view of a conventional suction pad.
Figure 2:
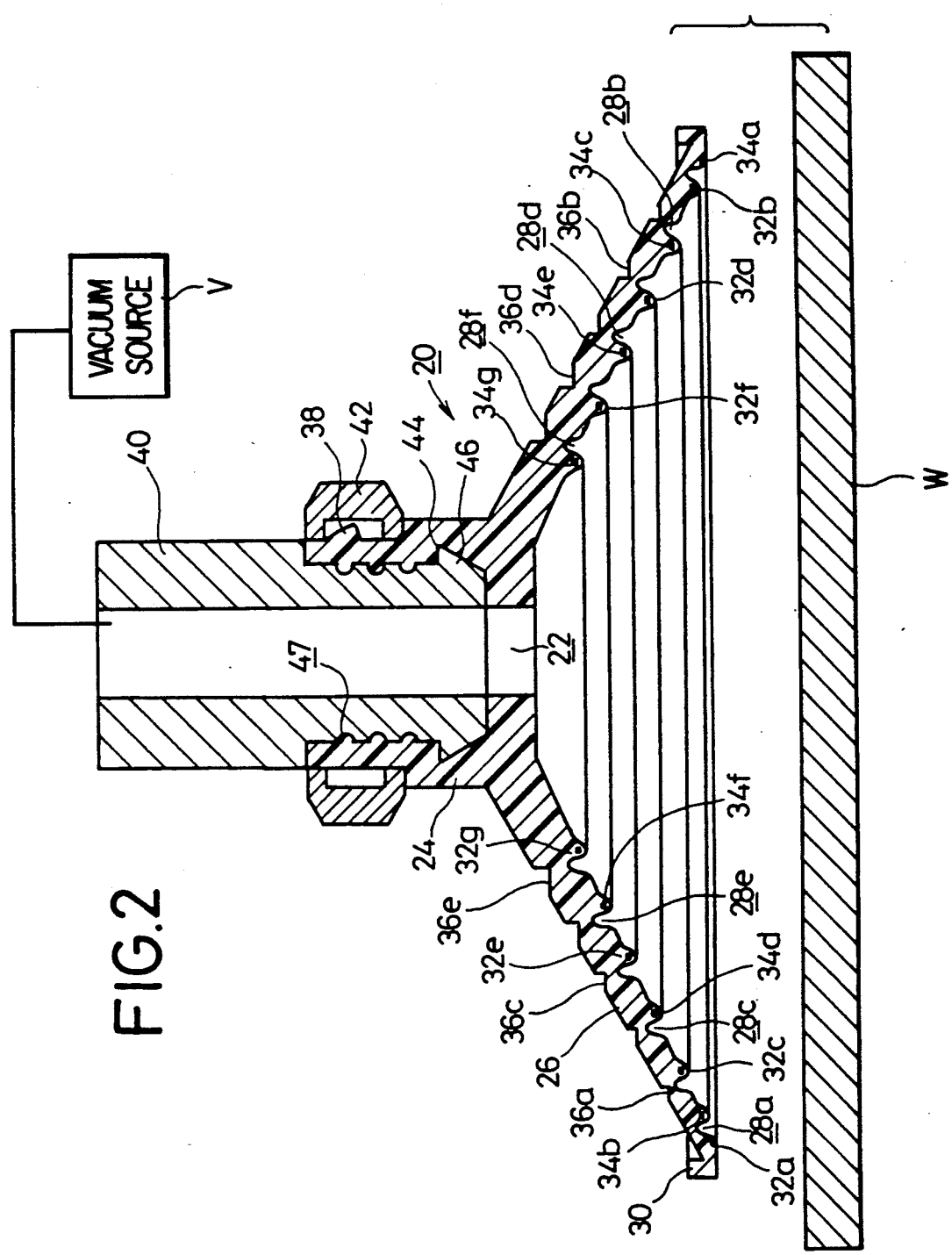
FIG. 2 is a vertical cross-sectional view of a suction pad according to one embodiment of the present invention.

Referring to FIG. 2, designated at numeral 20 is a suction pad according to one embodiment of the present invention. The suction pad 20 comprises a cylindrical base 24 having a hole 22 defined therein, which is coupled to a vacuum suction source V, and a suction skirt 26 integrally provided in continuation with the base 24.

The skirt 26 has a plurality of grooves 28a through 28f concentrically or circumferentially defined in an inner peripheral surface thereof and whose diameters are different from one another. A rib 30 which is disposed in a position opposite to the position where the groove 28a is defined and which is formed in a circumferential end of the skirt 26, projects upward as seen in FIG. 2. In addition, color marks 34a through 34g as wear or abrasion detecting means are applied to a plurality of extensions 32a through 32g extending in the opposite directions as seen from the grooves 28a through 28f, respectively.

As shown in FIG. 2, for example, the extension 32a may preferably be shaped in the form of a semispherical cross-section in order to prevent noise-production.

In addition, a plurality of steps 36a through 36e are formed onto an outer peripheral surface of the skirt 26 while they are being associated with the grooves 28a through 28f. On the other hand, there are also formed on a smaller-diameter outer peripheral wall of the base 24 a plurality of protrusions 38 projecting from the outer peripheral wall thereof (see FIG. 2). The reason for the provision of the protrusions 38 is as follows. Namely, they are caused to engage a ring member 42 so as to hold an adapter 40 by an arm of a robot (not shown), thereby displacing the arm to feed a work in a predetermined direction. As is understood from the drawing, the base 24 has a groove 44 defined therein, which is shaped in the form of an inverted cone-shaped trapezoid. In addition, a cone-shaped trapezoidal projection 46 of the adapter 40 is inserted into the groove 44 so as to be fit therein, and the ring member 42 is fit in the base 42 so as to sandwitch the base 42 between the ring member 42 and adapter 40 with a pressure, thereby uniting the suction pad 20 and the adapter 40 into a single unit. Further, in the present embodiment, a plurality of annular recesses 47 are defined in the surface of adapter 40. Accordingly, a sealing effectiveness is obtained since a part of base, which is of resilient material, will be embossed into the recesses 47 by a pressure through the ring member 42 and adapter 24.

The suction pad according to the present invention is basically constructed as described above. A description will now be made of operation and advantages of the suction pad.

First, the adapter 40 is engaged with an arm of robot (not shown).

When it is desired to attract and hold a work W by the suction pad 20, a vacuum suction source V is energized after the skirt 26 is brought into contact with the work W so as to subject the inside of the skirt 26 to vacuum through the hole 22 of the base 24, thereby attracting the work W by the suction pad 20. At this time, the suction pad 20 is pressed against the work W. As a consequence, air in the skirt 26 is compressed and hence discharged outwardly of the skirt 26 at some point. According to the present invention, however, since the extensions 32a through 32g are provided and the extension 32a has high rigidity in particular, a peripheral edge of the suction pad 20 is prevented from being flexed. Since the lower surface of the extension 32a abuts against the work W, the circumferential end of the skirt 26 is no longer vibrated. It is therefore possible to control or suppress any sound which is likely to be produced at the circumferential end of the skirt 26 as in the prior art. In addition, the rib 30 is also formed onto the outer peripheral surface of the skirt 26 facing the extension 32a. Therefore, a suction surface of the skirt 26 with respect to the work W can more reliably be prevented from being deformed.

According to the present invention, there are also formed onto the skirt 26 the steps 36a through 36f. If such steps are cut using, for example, a cutter knife, then the diameter of the skirt 26 of the suction pad 20 can be freely cut off. Specifically, the diameter of the suction pad 20 can be selected according to the dimension or weight of the work W.

When the suction pad 20 is used many times, an inner peripheral edge of the skirt 26 is worn. If any one of the color marks 34a through 34g is exposed outward at this time, then confirmation can be made as to whether or not the suction pad 20 is worn. Specifically, the outward exposure of any one of the color marks 34a through 34g reliably provides the timing for replacing the present suction pad 20 by a new one. As a result, the use of the suction pad 20 previously permits prevention of the work W from being exposed to an accident such as the work W being dropped while being fed.

Since air exists or remains in the grooves 28a through 28g, the definition of the grooves 28a through 28g in the skirt 26 facilitates separation of the inner surface of the skirt 26 of the suction pad 20 from the work W upon supplying compressed air to the inside of the suction pad 20 when it is desired to move the work W away from the suction pad 20, for example.

Figure 3:
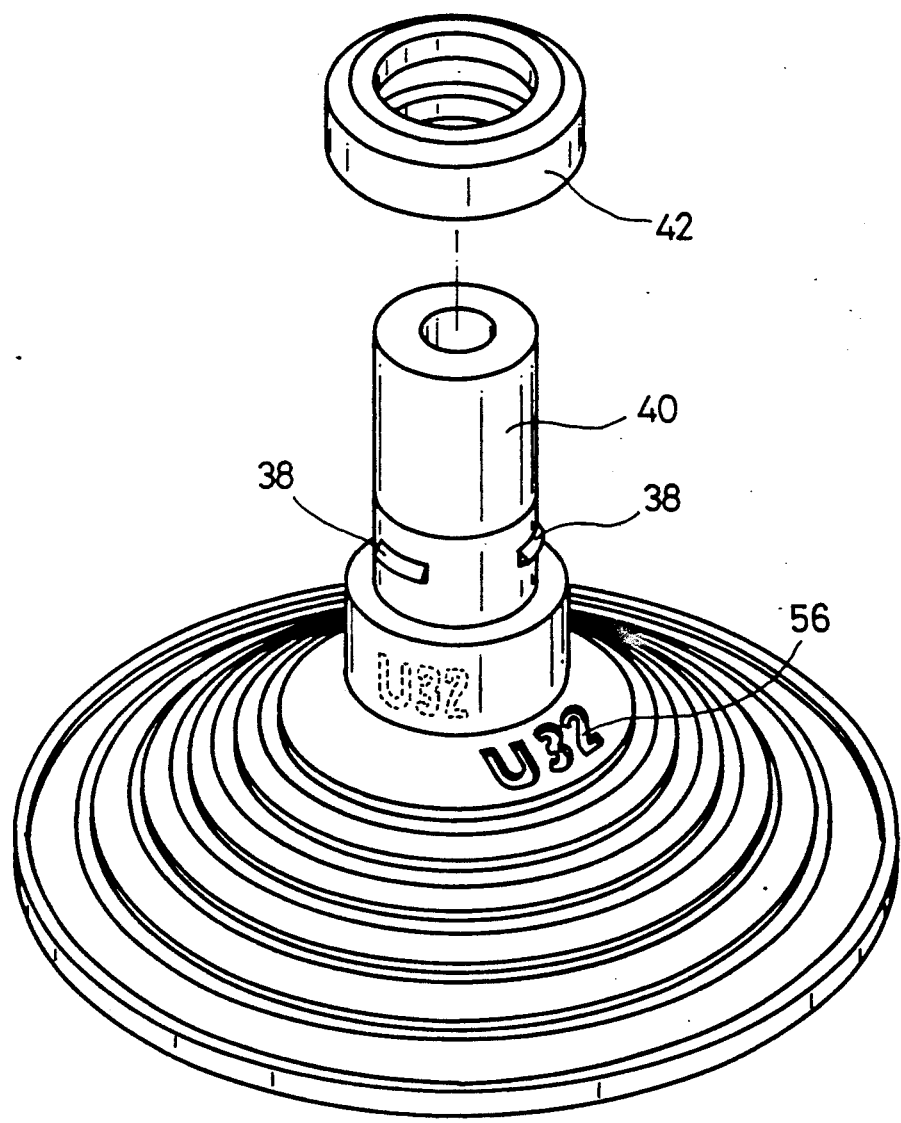
FIG. 3 is an exploded perspective view of the suction pad shown in FIG. 2.

Referring to FIG. 3, the skirt 26 has recesses 56 defined therein, each of which has a surface on which paint is applied. It is needless to say that each recess 56 is formed in such a manner that any tear cannot be produced by repeatedly attracting and holding the work W with the suction pad, i.e., by expansion and shrinkage of a flexible resin body constituting the skirt 26.

The paint which has been applied to each recess 56 defined in the skirt 26 is not separated from the recess 56 due to the definition of the recess 56 in the skirt 26 even when the work W is repeatedly attracted and held by the suction pad 20, i.e., the above flexible resin body is repeatedly expanded and shrunk. Therefore, characters indicative of, for example, the quality of materials for the suction pad 20, the dimension of the suction pad 20, symbols for the suction pad 20, etc. can be identified, and hence the suction pad 20 is no longer misused. The present embodiment shows and describes the definition of each recess 56 in the skirt 26. However, the present invention is not necessarily limited to the present embodiment. The same effect as described above can be obtained even when each recess 56 is defined in the base 24 and characters, symbols, etc. used for the suction pad 20 are denoted thereon as indicated by the broken line.

Furthermore, in the present embodiment, instead of painting some characters and/or symbols to indicate a size, diameter and so forth of the suction pad, fine grain patterns may be appeared in the recess.

Figure 4:
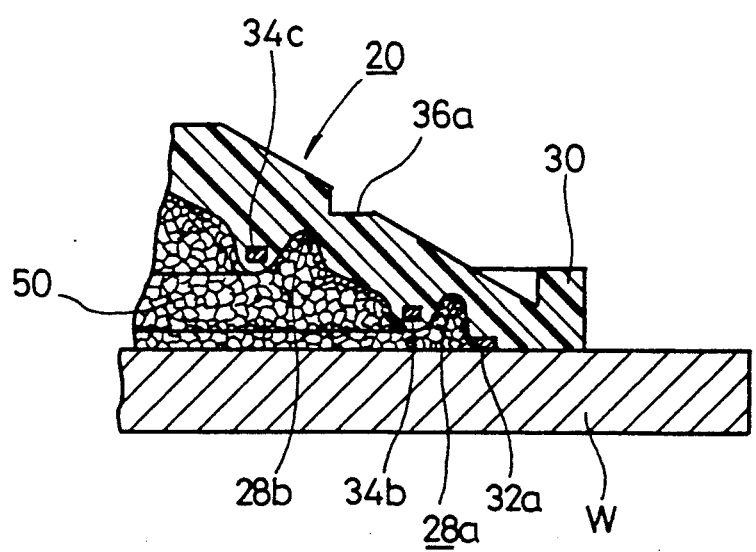
FIG. 4 is a partly cut-away enlarged vertical cross-sectional view of a suction pad according to another embodiment of the present invention.

FIG. 4 shows another embodiment of the present invention. In the present embodiment, there are provided a number of ribs 50 on an inner peripheral surface of a suction skirt 26. When a suction pad 20 is released from a work W, the suction pad 20 is easy to be separated from the work W in the same manner as the grooves 28a through 28f.

According to the present invention, as has been described above, it is possible to prevent the work W from being released from the suction pad although the suction pad is of an extremely simple arrangement, and to avoid any noise produced at the time the work W is attracted and held by the suction pad.

Any wrinkle is not formed on the peripheral edge of the skirt owing to the provision of the circumferential rib of the skirt. As a consequence, the possibility of releasing the work from the suction pad so as to meet an accident can be reduced. In addition, when it is desired to release the work from the suction pad, the compressed air is easily introduced into the concentric or circumferential grooves defined in the inner peripheral surface of the skirt so as to enable the skirt to be released from the work.

Since there are formed a plurality of protrusions on the base, the suction pad can be prevented from being moved away from the adapter. In addition, the size of the suction pad can be freely selected according to the size and weight of the work.

Since the recesses are defined in the skirt or at lease a part of the surface of the base, and the paint is applied to each recess, the paint is not separated from each recess even when the flexible resin body constituting the skirt is expanded and shrunk by work feeding operations or the like. Therefore, the characters indicative of, for example, the quality of the material of the suction pad and the size thereof, and the symbols for the suction pad, etc. can be identified, and hence the suction pad is no longer misused. In addition, the unseparation of the paint from each recess can save the time required to repeatedly apply the characters, the symbols, etc. on the skirt.

Although certain preferred embodiments have been shown and described, the present invention is not necessarily limited to the present embodiments. It should be understood that many changes and modifications may be made without departing from the spirit or scope of the invention as set forth herein.

What is claimed is:

1. A suction pad for attracting and holding a workpiece, comprising:
   a suction base coupled to a vacuum suction source;
   a suction skirt connected with said base and projecting radially outwardly from said base, said skirt having a peripheral edge; said peripheral edge being brought into contact with the workpiece for attracting and holding the workpiece;
   a rib provided proximate to said peripheral edge of said suction skirt for preventing deformation of said peripheral edge when said edge is brought into contact with the workpiece;
   a plurality of grooves concentrically defined on an inside surface of said suction skirt, each of said grooves having a different diameter; and
   a plurality of steps concentrically defined on an outside surface of said suction skirt substantially opposite from said grooves.

2. A suction pad according to claim 1, said suction skirt having a plurality of cuttable thin-walled portions defined respectively between said grooves and said steps, said thin-walled portions having progressively increasing diameters concentrically formed on said skirt, wherein said thin-walled portions are cuttable along said grooves.

3. A suction pad according to claim 2, wherein a plurality of extensions are concentrically disposed on the inside surface of said suction skirt adjacent said grooves and near each of said thin-walled portions, wherein said extensions serve as sealing edges after said thin-walled portions have been cut along said grooves.

4. A suction pad according to claim 1, wherein means for identifying a degree of abrasion of the inside surface of said suction pad are provided on said skirt, said means for identifying comprising colored markings embedded in said skirt whereby said markings become exposed after a predetermined degree of abrasion.

5. A suction pad according to claim 1, wherein said grooves comprise a plurality of concave grooves, wherein air remains in said grooves when the workpiece is attracted and held by said suction pad.

6. A suction pad according to claim 5, further comprising a plurality of ribs formed on the inside surface of said suction pad.

7. A suction pad according to claim 1, wherein recesses for indicating one of characters and symbols by applying one of paint and fine grain patterns thereto are defined in at least a part of the outside surface of said suction pad.

8. A suction pad according to claim 7, wherein said recesses are defined in said suction skirt.

9. A suction pad according to claim 7, wherein said recesses are defined in said base.

* * * * *